Sept. 2, 1969    F. POTAIN    3,464,169
LIFTING DEVICE FOR A TELESCOPIC MAST
Filed June 26, 1967    6 Sheets-Sheet 1

INVENTOR
Faustin Potain
BY
ATTORNEYS

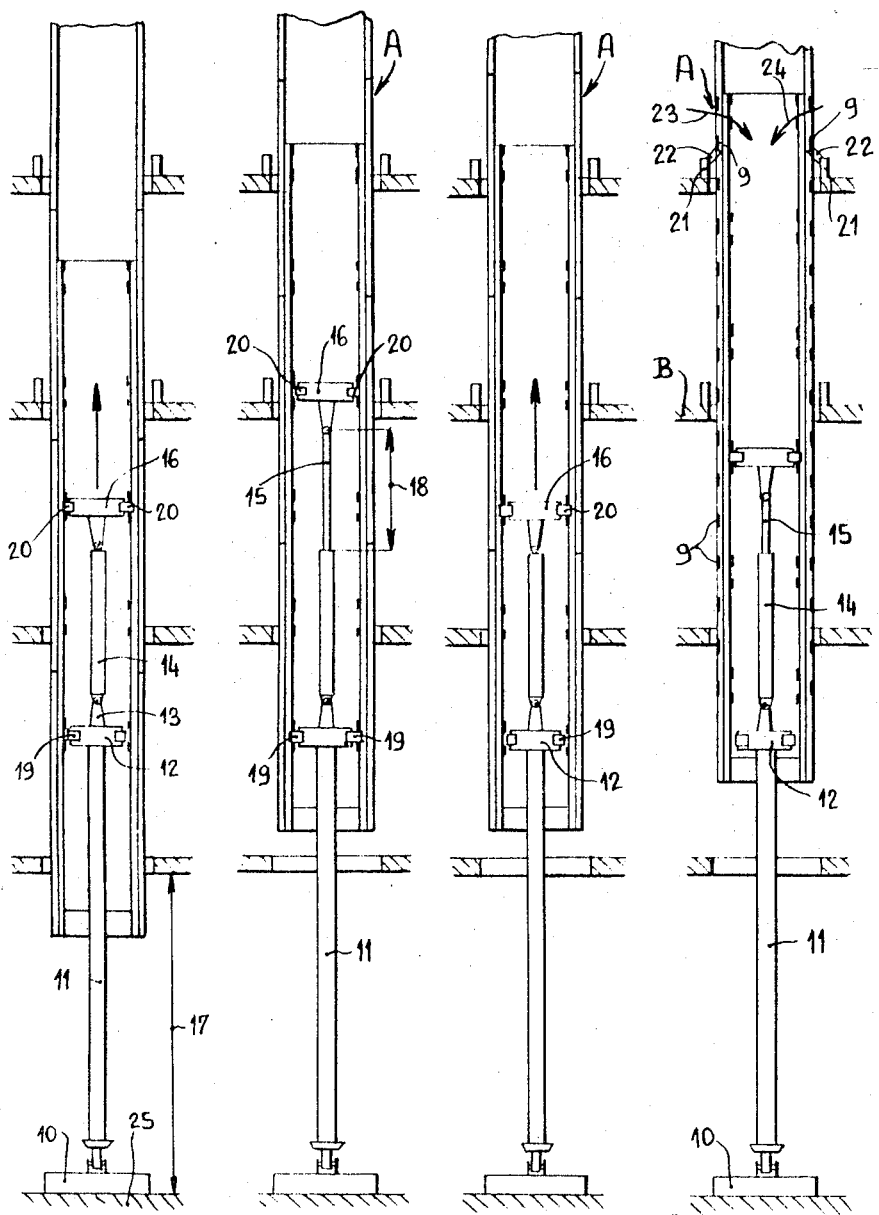

Sept. 2, 1969  F. POTAIN  3,464,169
LIFTING DEVICE FOR A TELESCOPIC MAST
Filed June 26, 1967  6 Sheets-Sheet 3

INVENTOR
BY
ATTORNEYS

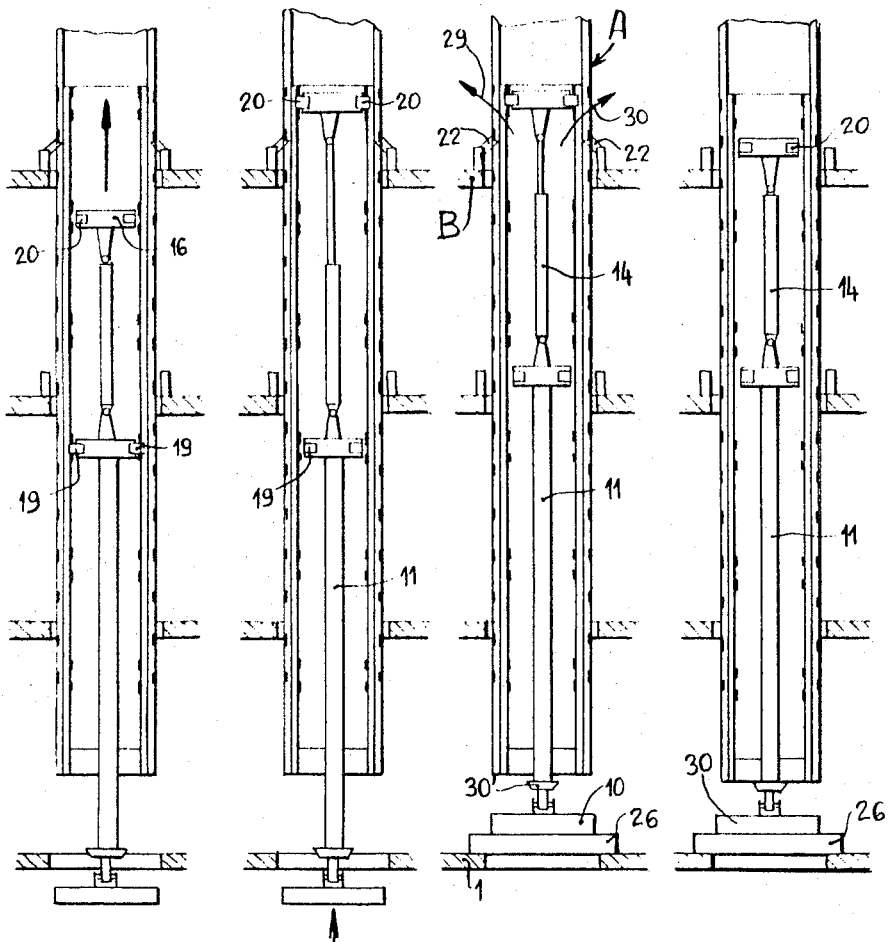

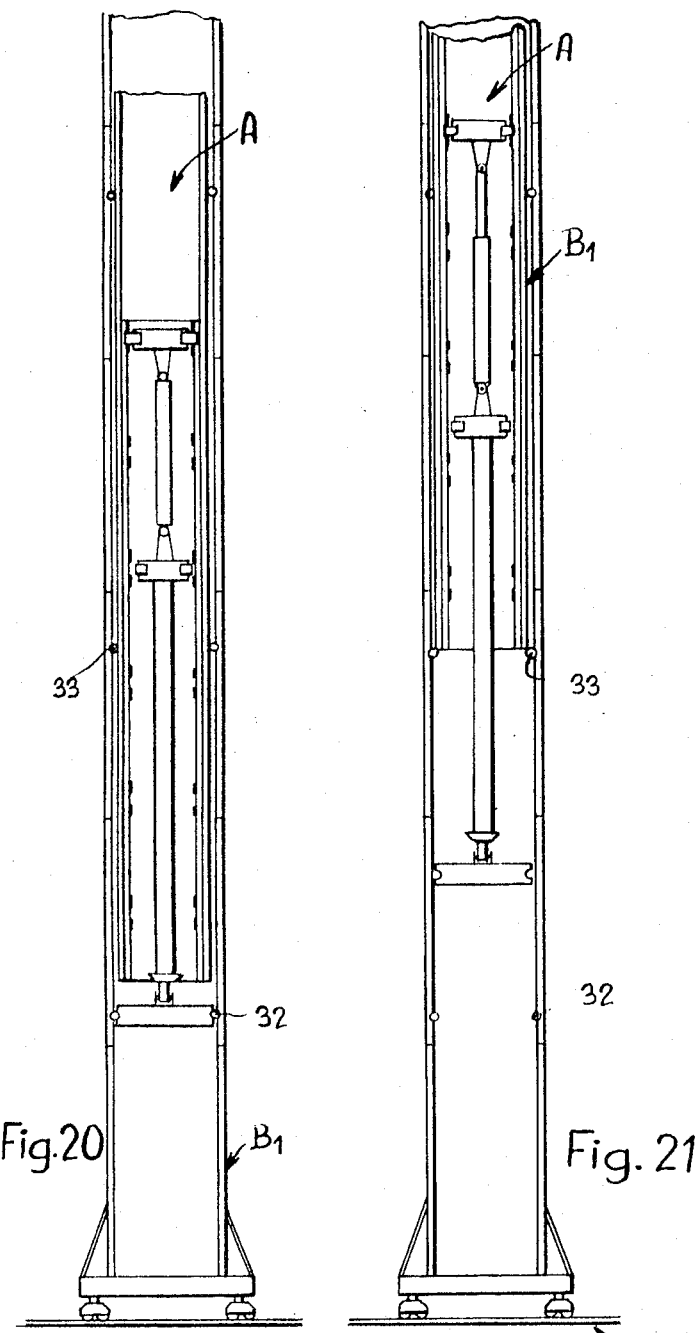

United States Patent Office 3,464,169
Patented Sept. 2, 1969

3,464,169
LIFTING DEVICE FOR A TELESCOPIC MAST
Faustin Potain, La Clayette, France, assignor to Etablissements F. Potain, La Clayette, Saone-et-Loire, France, a French joint-stock company
Filed June 26, 1967, Ser. No. 648,605
Int. Cl. E04h *12/34*
U.S. Cl. 52—115                                                 5 Claims

ABSTRACT OF THE DISCLOSURE

A lifting device is provided comprising a stand, a fixed strut, upper and lower lateral members, and a jack between the lateral members. The device is employed to effect the telescoping of a mast having a fixed lower part and a raisable part. The upper and lower lateral members are alternately latched to the raisable member, and the jack extended and contracted in correlation therewith. Supports are provided for supporting the raised part in its new raised position relative to the fixed part, and the jack and lateral members may be operated to raise the lifting device to a fresh starting position.

---

The present invention relates to improvements to devices of the type used to telescope vertical components, such as masts or towers (herein referred to as masts) mainly in the case of cranes.

Telescoping devices are known which allow a crane head and the upper part of the mast attached to it to be elevated by telescoping on the lower part of the mast which is mounted in a fixed position. In addition, mainly in the case of the construction of large buildings, a known method is to use a crane of which the mast is engaged vertically in a well provided in the building (for example the well of a lift shaft). In this case, the fixed part of the crane mast is constituted by the building itself, and this allows the crane head to rise at the same time as the building goes up.

The two known techniques which have just been described have necessitated up to the present the use of cranes of different designs. The invention has the main aim of avoiding this inconvenience by creating a lifting device able to be used in both cases, provided that a very simple modification is made. In what follows, it must therefore be understood that the term "fixed part of the mast" implies equally well a metal tower surrounding the raisable part or a building under construction on which the upper raisable part of the mast rests whilst the building rises.

According to this invention a lifting device for a telescopic mast comprises a stand above which there is a fixed strut, there being a first lateral member at the upper end of the strut provided with means for latching it to a raisable part of the mast and an extensible strut extending above the first lateral member and carrying at its upper end a second lateral member also provided with means for latching it to the raisable part of the mast.

Preferably the fixed strut is longer than the possible extension of the extensible strut, and it is also preferred to constitute the latter by a fluid operated ram and cylinder device.

According to a preferred feature of the invention a telescopic mast comprises a fixed lower part and a raisable part provided internally with a lifting device in accordance with the invention.

It will be understood that the upper part of a mast so designed may be utilised as such equally well on the inside of buildings under construction as on a metal tower, by means of a simple exchange of the stand fitted to the base of the fixed strut.

The invention will be better understood from the following description, given by way of example only, of two arrangements in accordance with the invention.

Figure 1:
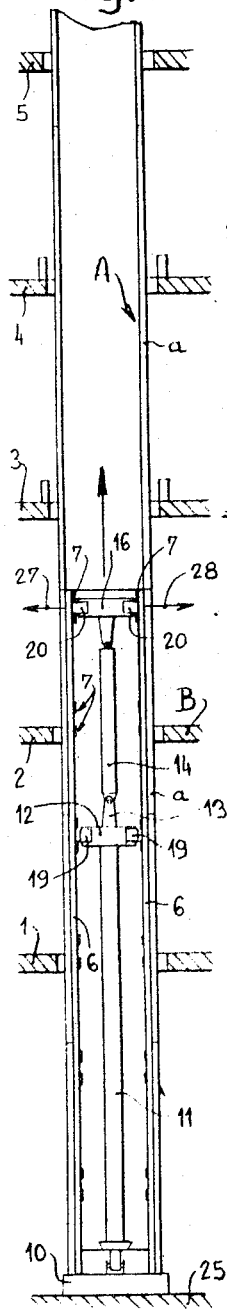
Figure 17:
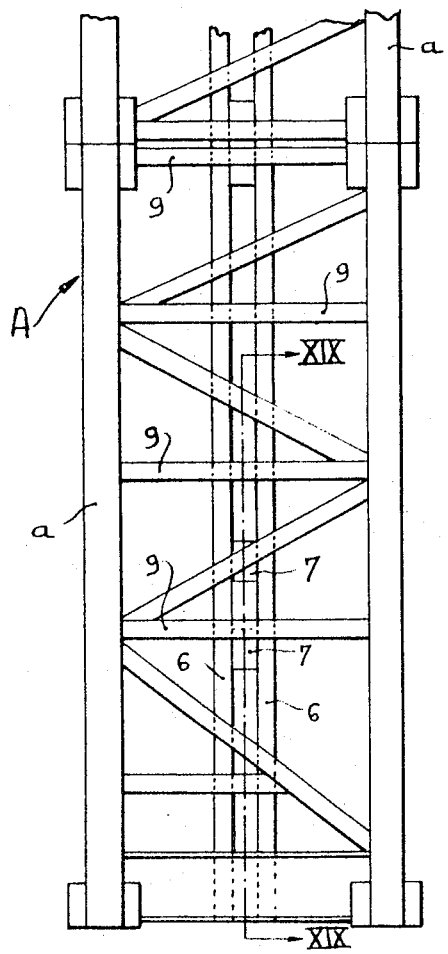
Figure 19:
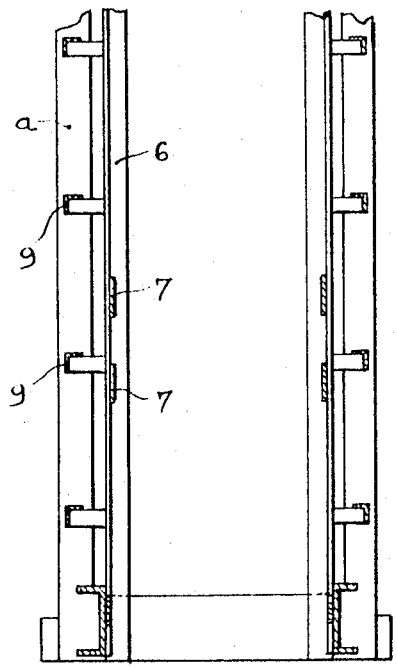
Figure 18:
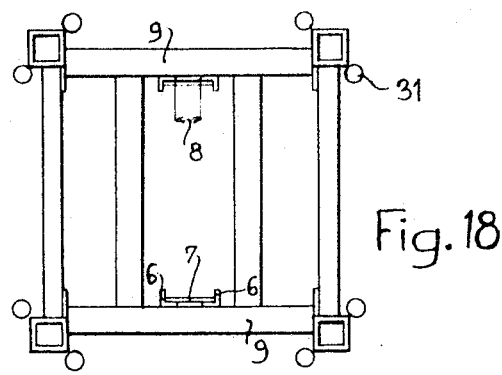

In the accompanying drawings:
FIGURE 1 is an elevation of the lower end of a tower crane inside a building in the course of construction,
FIGURES 2 to 7 show successive stages during lifting of part of the crane,
FIGURE 8 shows the position at the end of the lifting operation,
FIGURES 9 to 14 show successive stages during the raising of the lifting device to a new operating level,
FIGURE 15 shows the position with the lifting device in the new, raised, position,
FIGURE 16 shows the position when the lifting device is ready to begin a fresh lifting operation,
FIGURE 17 is a side view to a larger scale of part of the mast,
FIGURE 18 is a plan view of the part shown in FIGURE 17,
FIGURE 19 is a section on the line XIX—XIX in FIGURE 17, and
FIGURES 20 and 21 correspond respectively with FIGURES 1 and 2, but show an alternative arrangement.

The crane shown in FIGURES 1 to 19 comprises a telescopic mast having a hollow upper portion extending longitudinally of the lift shaft of a building B under construction. This building includes several stories shown schematically by floors such as 1, 2, 3, 4 and 5.

The hollow upper portion A of the mast is formed by placing one above the other of identical parts *a*. In addition the part *a* at the bottom of the upper part A is provided internally with two ladders arranged vertically, opposite each other. Each of these ladders comprises two vertical stiles 6 (FIGURES 1–17–18–19) between which are welded braces or rigid stop members 7 arranged in pairs at regular intervals. The stiles 6 are preferably constituted by angle-irons arranged in the centre of the appropriate face of the part A of the mast, and the cross-braces joining them are made with a useful length 8 as small as possible, in order to improve the strength and rigidity of the assembly.

In addition, each component A of the mast is formed by a metal trellis of known type, which present on two opposite external faces a series of regularly spaced transverse rungs 9. To simplify the drawings, these external rungs are not shown in FIGURES 1 to 7.

In this arrangement the entire structure A can be raised, and it is the building B itself which provides the fixed lower part of the crane.

An inner mast position or lifting device is provided, this lifting device having a stand 10 adapted to rest on the base of the lift shaft (or other floor) as shown in FIGURES 1 to 8. A rigid strut 11 extends vertically upwards from the stand and it is important that this strut has a length greater than the height between stories of the building.

The strut 11 carries at its top a first lateral member 12, and a clevis 13 to which is jointed the lower end of the cylinder 14 of a double-action hydraulic jack. The ram 15 of the jack is jointed at its free end to the centre of a second lateral member 16 which crowns the assembly of the lifting device. In effect, the jack provides an extensible strut between the two lateral members 12 and 16.

The height of the strut 11, that is to say the distance separating the stand 10 from the lateral member 12, must be greater than or equal to the greatest height 17 which it is desired to raise the upper part A of the mast in a single operation, that is to say without having to displace the stand 10. On the other hand, this height 17 is equal to several times the lift 18 of the jack 14–15.

The lateral-members 12 and 16 are disposed horizontally, and carry at their ends retractable latches or abutment means which have been indicated by the references 19 and 20 respectively. These latches are intended to bear, when required, under the braces 7 of the internal face of the raisable part A of the mast.

Finally, these are provided on the floors 1, 2, 3, 4 or 5 of the building B, supports 21 to which are jointed swinging props 22 able to be lowered towards the upper part A of the mast, as shown in FIGURE 8 by the arrows 23 and 24, so as to bring their tops below the exterior rungs 9 of the upper part A of the mast, in order to hold it by latching directly on to the building B.

The operation is as follows:

It is supposed that at the start the stand 10 rests direcently on the ground 25, but it is clearly obvious that it could be carried by any support whatever, notably by a crossbeam 26 of the kind shown in FIGURES 15 and 16.

The telescoping of the crane to elevate the upper part A of the mast to the height 17, which corresponds for example to that of a storey, is carried out in several successive stages.

First stage—FIGURE 1.

The base of the telescopic part A of the mast rests on the stand 10 and the jack 14 is contracted. The latches 19 are kept retracted, whilst the latches 20 of the upper lateral-member 16 are projected in the direction of the arrows 27 and 28. These latches 20 thus bear under the interior brances 7. The jack 14–15 is then expanded which elevates the upper part A to bring it to the position shown in FIGURE 2.

Figure 2:
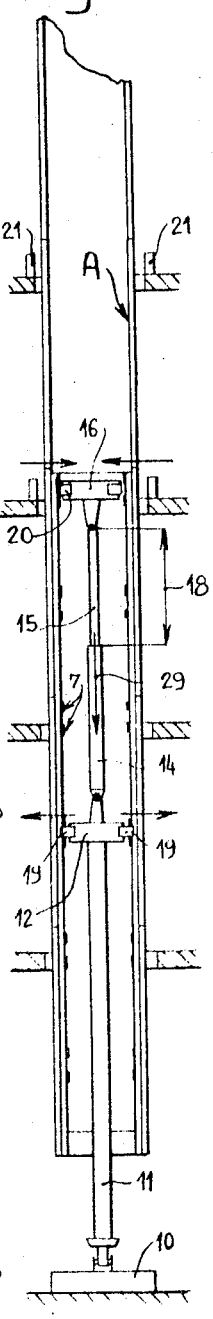

Second stage—FIGURE 2.

The latches 19 of the lateral member 12 are extended to bear under the corresponding braces 7 and the latches 20 are retracted. The jack 14–15 is then contracted in the direction shown by the arrow 29, which lowers the lateral-member 16 to the position shown in FIGURE 3, whilst the upper part A of the mast remains latched on to the strut 11, through the lateral-member 12.

Figure 3:
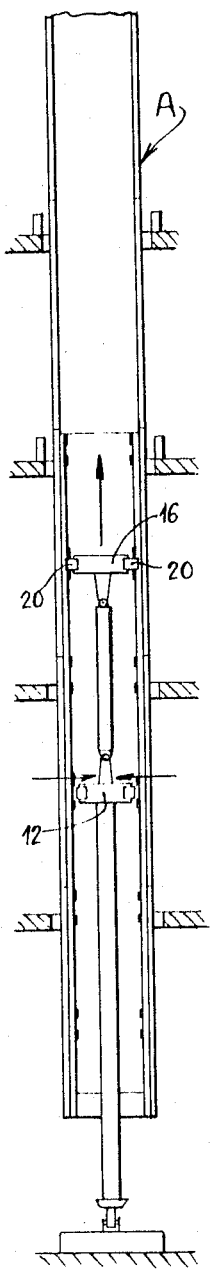

Third stage—FIGURE 3

Figure 4:
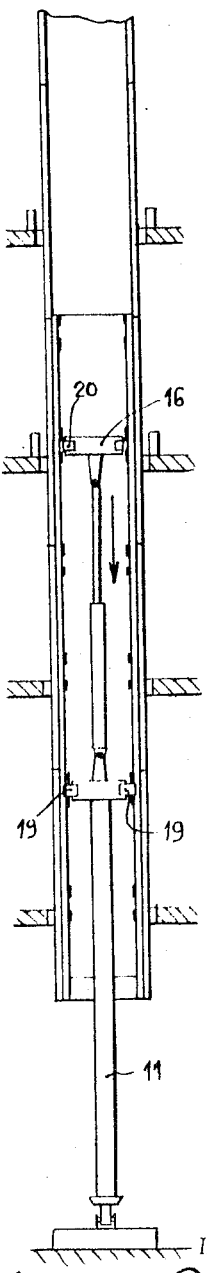

The latches 20 of the lateral-member 16 are extended, and the latches 19 of the lateral-member 12 withdrawn, then the jack is against expanded, to raise the upper part A of the mast to the position shown in FIGURE 4.

Fourth stage—FIGURE 4

The latches 19 are extended to lock the upper part A to the top of the strut 11, then the latches 20 of the upper lateral-member 16 are withdrawn, and the jack contracted to the position shown in FIGURE 5.

Fifth stage—FIGURE 5

The latches 20 of the upper lateral-member 16 are extended, then the latches 19 of the lateral-member 12 are withdrawn, and the jack 14–15 expanded, to the position shown in FIGURE 6.

Sixth stage—FIGURE 6

The latches 19 are extended, and the latches 20 withdrawn, so that the upper part A of the mast again bears on the top of the strut 11. The jack 14–15 is then contracted to the position shown in FIGURE 7.

Seventh stage—FIGURE 7

The latches 20 of the upper lateral-member 16 are extended, then the latches 19 of the lateral-member 12 withdrawn. The jack is then expanded, so as again to raise the upper part A of the mast.

It is to be noted that up to this point, during all the preceding stages, the upper part A has never been directly locked on to the surrounding building B, that is to say on to the lower part of the mast.

Eighth stage—FIGURE 8

At the end of the expanding travel of the jack 14–15, the two props or supports 22 are lowered inwardly in the direction of the arrows 23 and 24, then the upper part A is allowed to descend on to them by slightly contracting the jack 14–15. The telescopic part A bears on the props 22 on two of its exterior rungs or rigid stop members 9. When the jack 15 is contracted completely, which has the effect this time of raising the whole assembly of the strut 11, its stand 10 and lateral-member 12 to the position shown in FIGURE 9.

Figure 9:
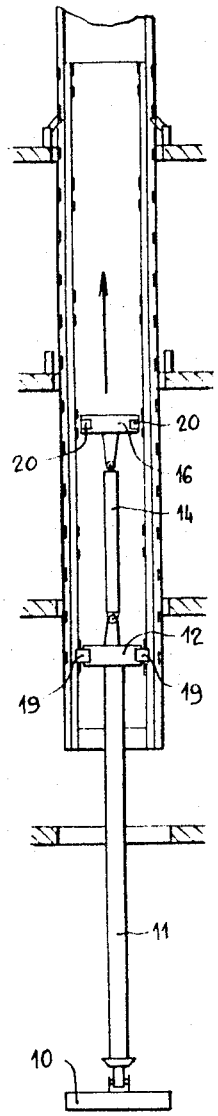

Ninth stage—FIGURE 9

Figure 10:
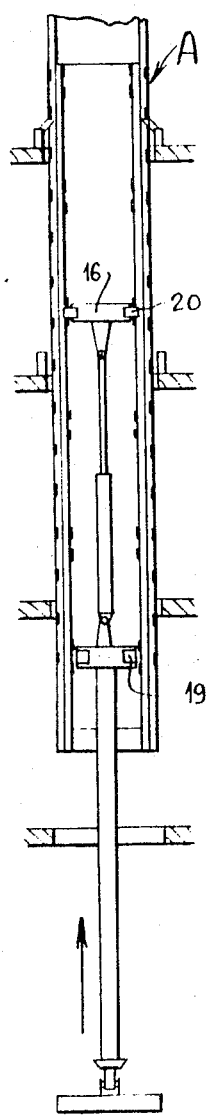

The latches 19 of the lateral member 12 are extended, then the latches 20 of the upper lateral member 16 are retracted, and the jack expanded to the position shown in FIGURE 10.

Tenth stage—FIGURE 10

The lateral-member 16 having been elevated within the telescopic part A of the mast, it is fixed there by extending the latches 20, after which the latches 19 are withdrawn. The jack is then contracted, which again raises the strut 11 and its members 10 and 12 to the position shown in FIGURE 11.

Figure 11:
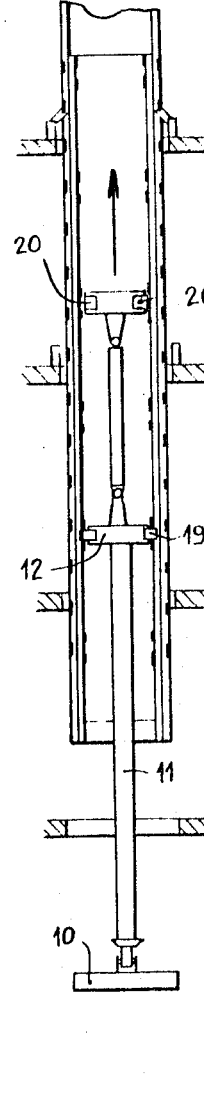

Eleventh stage—FIGURE 11

Figure 12:
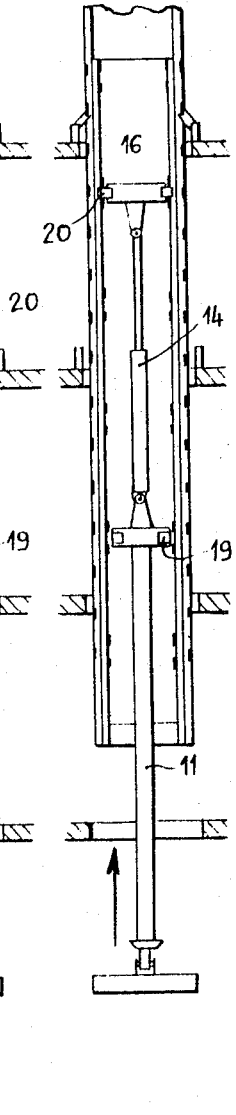

The latches 19 are extended and the latches 20 withdrawn, then the jack is expanded so as to elevate to FIGURE 12.

Twelfth stage—FIGURE 12

The latches 20 are extended and the latches 19 retracted, then the jack is contracted to raise the strut 11 and its accessories to the position shown in FIGURE 13.

Thirteenth stage—FIGURE 13

The latches 19 are extended, then the latches 20 withdrawn, and the jack expanded to raise the lateral-member 16 to the position shown in FIGURE 14.

Fourteenth stage—FIGURE 14

The latches 20 are extended and the latches 19 withdrawn, then the jack 14–15 contracted to raise once more the strut 11, the stand of which is then brought above the level of the floor 1.

Fifteenth stage—FIGURE 15

The beam 26, of which the ends bear on the surrounding floor 1, is slid under the stand 10.

It will be noticed that during all the stages 9 to 14 the upper part A of the mast has remained stationary in relation to the building B, bearing on the props 22.

The jacks 14–15 is then slightly expanded in order to raise the upper part A sufficiently to retract the props 22 by swinging them outward in the direction of the arrows 29 and 30, and finally the jack 14–15 is contracted until the upper part A of the mast rests directly on a stop $30^1$ provided at the base of the strut 11, that is to say in the position shown in FIGURE 16.

Sixteenth stage—FIGURE 16

The latches 20 are withdrawn and the jack completely contracted. The crane is then ready, either to be used at this level or to be elevated by a fresh cycle of telescoping.

It must moreover be understood that the preceding description has been given only by way of example and that it in no way limits the scope of the invention which will not be avoided by replacing the described details of construction by any other equivalents.

In particular, the scope of the invention will not be avoided by using this device on a crane the mast of which includes a lower fixed part formed by a metal framed tower $B_1$ (FIGURES 20 and 21), of known type, instead of the building B. This lower tower could then be raised by placing sections or fitting panels on its top in proportion as the upper part A is elevated. There would thus be obtained a crane of known type the mast of which telescopes at the top.

In the case of this variant, the upper part A is telescoped by the process which has just been described. For this it suffices to provide on the internal face of the fixed mast or tower B, support rungs such as 32, 33, etc. which play the same part of supporting as the floors, 1, 2, 3 in the preceding example. Naturally, the fixed mast B, may be, if required, raised by any known methods when the upper part A has reached the level of its top, which allows the operation to be re-commenced. In particular, the rungs 32, 33 etc. are preferably capable of acting in cooperation with catches or similar devices not shown to hold the upper part A in the same way as the locking props 22.

It will be noticed that the device according to the invention allows automatically working catches or similar devices to be used at the latches 19 and 20. These automatic latches may be of any known type, and carry spring-operated sliding or swinging pawls.

What is claimed is:

1. A telescopic mast of the type adapted to climb from one level to another within a surrounding stationary supporting structure by alternate elongation and contraction in conjunction with the operation of suitable latching means between said telescopic mast and said supporting structure; comprising a hollow outer mast portion and an inner mast portion movable relative to each other, said inner mast portion being comprised of a stand adapted to be supported on said supporting structure at a plurality of different levels and on the ground, a fixed strut extending upward from said stand within said hollow mast portion, a first lateral member carried at the upper end of said fixed strut, first complementary latching means on said hollow mast portion and said first lateral member for releasably latching said first lateral member to said hollow mast portion, an extensible strut extending upwardly within said hollow mast portion and secured at one end to said first lateral member, a second lateral member secured to the opposite end of said extensible strut, second complementary latching means on said hollow mast portion and said second lateral member for releasably latching said second lateral member to said hollow mast portion, and third complementary latching means adapted to releasably latch said hollow mast portion to said supporting structure at a plurality of different levels.

2. A telescopic mast as set forth in claim 1 wherein the portions of said first and second latching means on said hollow mast portion are comprised of a plurality of rigid stop members secured at spaced locations within said hollow mast portion in a line along the length thereof and the portions of said first and second latching means on said first and second lateral members are comprised of movable abutment means adapted to be projected and retracted into and out of engagement with said stop members.

3. A telescopic mast as set forth in claim 1 wherein said third complementary latching means is comprised of a plurality of additional rigid stop members secured to said hollow member and a plurality of movable supports adapted to be mounted on said supporting structure at a plurality of different levels for movement into and out of supporting engagement with selected additional stop members.

4. A lifting device according to claim 1 wherein said fixed strut is longer than the possible extension of said extensible strut.

5. A lifting device according to claim 1, wherein said extensible strut comprises a fluid operable ram-and-cylinder device.

References Cited
UNITED STATES PATENTS

| | | | |
|---|---|---|---|
| 2,996,284 | 8/1961 | Welborn | 52—126 X |
| 3,127,996 | 4/1964 | Schwing | 212—57 |
| 3,213,575 | 10/1965 | Boczek | 52—122 |
| 3,273,859 | 9/1966 | Walli | 52—126 X |
| 3,354,599 | 11/1967 | Martin | 52—122 X |

FRANK L. ABBOTT, Primary Examiner

PRICE C. FAW, Jr., Assistant Examiner

U.S. Cl. X.R.

52—121, 123, 126; 212—57; 254—139